No. 738,307. PATENTED SEPT. 8, 1903.
C. T. FINLAYSON.
FRICTION GRIP FOR WIRE ROPE TRAMWAYS.
APPLICATION FILED DEC. 26, 1902.
NO MODEL. 7 SHEETS—SHEET 1.

Witnesses
G. Sargent Elliott
Lewis W. Beard

Inventor:
Christopher T. Finlayson
By H. S. Bailey, Attorney

No. 738,307. PATENTED SEPT. 8, 1903.
C. T. FINLAYSON.
FRICTION GRIP FOR WIRE ROPE TRAMWAYS.
APPLICATION FILED DEC. 26, 1902.
NO MODEL. 7 SHEETS—SHEET 3.

No. 738,307. PATENTED SEPT. 8, 1903.
C. T. FINLAYSON.
FRICTION GRIP FOR WIRE ROPE TRAMWAYS.
APPLICATION FILED DEC. 26, 1902.
NO MODEL. 7 SHEETS—SHEET 5.

Witnesses:
G. Sargent Elliott.
Lewis W. Beard

Inventor:
By Christopher T. Finlayson
H. S. Bailey, Attorney.

No. 738,307. PATENTED SEPT. 8, 1903.
C. T. FINLAYSON.
FRICTION GRIP FOR WIRE ROPE TRAMWAYS.
APPLICATION FILED DEC. 26, 1902.
NO MODEL. 7 SHEETS—SHEET 6.

Witnesses
G. Sargent Elliott.
Lewis W. Beard

Inventor:
Christopher T. Finlayson
By H. S. Bailey, Attorney.

No. 738,307. PATENTED SEPT. 8 1903.
C. T. FINLAYSON.
FRICTION GRIP FOR WIRE ROPE TRAMWAYS.
APPLICATION FILED DEC. 26, 1902.
NO MODEL. 7 SHEETS—SHEET 7.

Fig. 25.

Witnesses:
G. Sargent Elliott.
Lewis W. Beard

Inventor:
Christopher T Finlayson
By H. S. Bailey Attorney.

No. 738,307. Patented September 8, 1903.

UNITED STATES PATENT OFFICE.

CHRISTOPHER T. FINLAYSON, OF DENVER, COLORADO.

FRICTION-GRIP FOR WIRE-ROPE TRAMWAYS.

SPECIFICATION forming part of Letters Patent No. 738,307, dated September 8, 1903.

Application filed December 26, 1902. Serial No. 136,726. (No model.)

*To all whom it may concern:*

Be it known that I, CHRISTOPHER T. FINLAYSON, a citizen of the United States of America, residing at Denver, in the county of Denver and State of Colorado, have invented certain new and useful Improvements in Friction-Grips for Wire-Rope Tramways; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in friction-grips; and the objects of my invention are, first, to provide a friction-grip that will run around a terminal sheave without releasing the grip from the rope; second, to provide a friction-grip that can be used on double-rope tramway systems that place the running or traction rope above the stationary rope and also below the running or traction rope; third, to provide a grip that is adapted to make reverse curves in a tramway-line; fourth, to provide a friction-grip that will pass over or under a sheave along a tram-line or at the terminals. I attain these objects by the mechanism illustrated in the accompanying drawings, in which—

Similar numerals of reference refer to similar parts throughout the several views.

Referring to the drawings, the numeral 1 designates the standing or stationary or track-rope, and 2 the running or traction ropes of an aerial wire-rope tramway, these two ropes constituting what is known as the "double-rope" system of wire-rope tramways. These two ropes will be hereinafter designated as the "track" and "traction" ropes, respectively. The ropes are positioned in planes substantially parallel with each other. The traction-rope may be placed either above or below the track-rope. The position of the traction-rope relative to the track-rope divides the double-rope system into two types, which I will designate as the "overhead-traction" system and the "depending-traction" system. The track-ropes are stationary ropes, which generally terminate at the terminals of the tramway in metal tracks that make a turn around the terminals. The terminals are frame structures adapted to support the turning sheaves and tracks and the loading and dumping apparatus.

My improved friction-grip is adapted to either type and to any arrangement of the double-rope system.

3 designates a trolley. It comprises a suitable supporting frame or housing 4, that encases the trolley-sheave wheels 5 and 6, which are pivotally supported at each end thereof by shafts 7 and 8, which are secured in the housing. A spreader-block 9 is secured to the housing between the trolley-wheels and forms an integral part of the trolley. A pendant 10 is pivotally secured to one side of the trolley by a pin 11. This pendant supports either a bucket 12 or a carrier, a bucket being preferably shown. The trolley is mounted on and runs on the track-rope and is propelled by the traction-rope through the medium of either grips or clips, of which there are several types, as follows: those that permanently attach the traction-rope and bucket or carrier together, those that automatically attach and detach to the buckets or carriers at the terminals, and those that are manually locked or attached at one terminal and are automatically unlocked or detached at the opposite terminal by contact with a suitably-arranged unlocking arm or bar placed in the running path of the bucket or carrier at the opposite terminals. This type is known as "friction-grips," and to this type my invention pertains.

Figure 1:
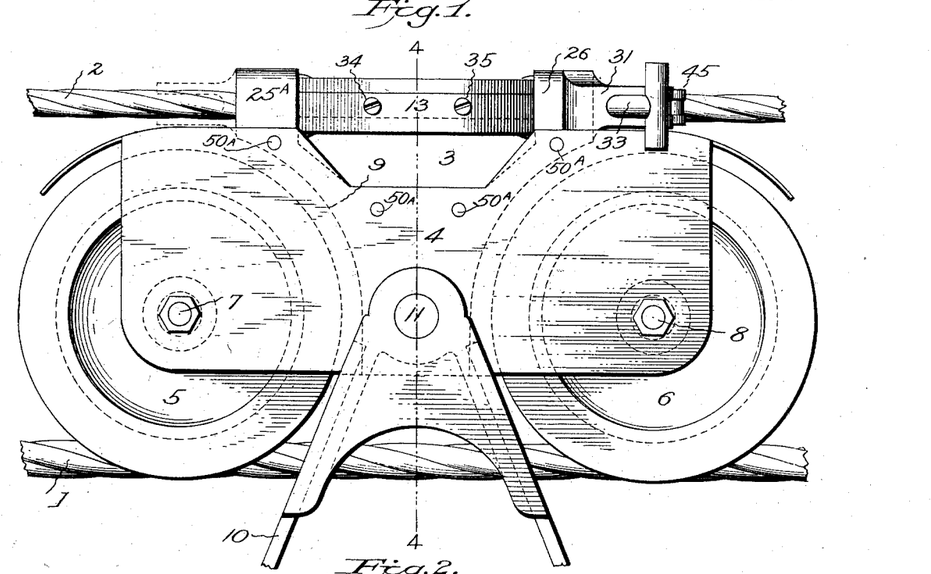
Figure 1 is a side elevation of my improved friction-grip.
Figure 2:
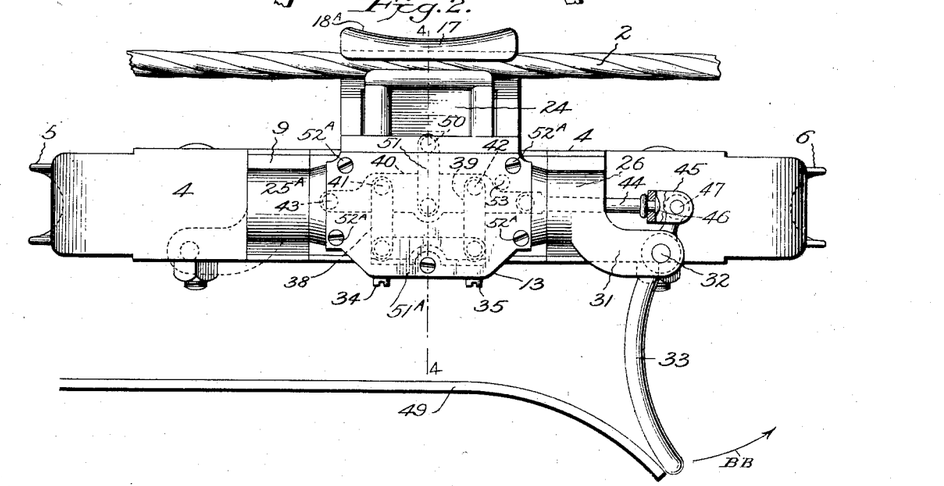
Fig. 2 is a plan view of Fig. 1.
Figures 3, 4, 9, 10, 11, 12, 13, 14:
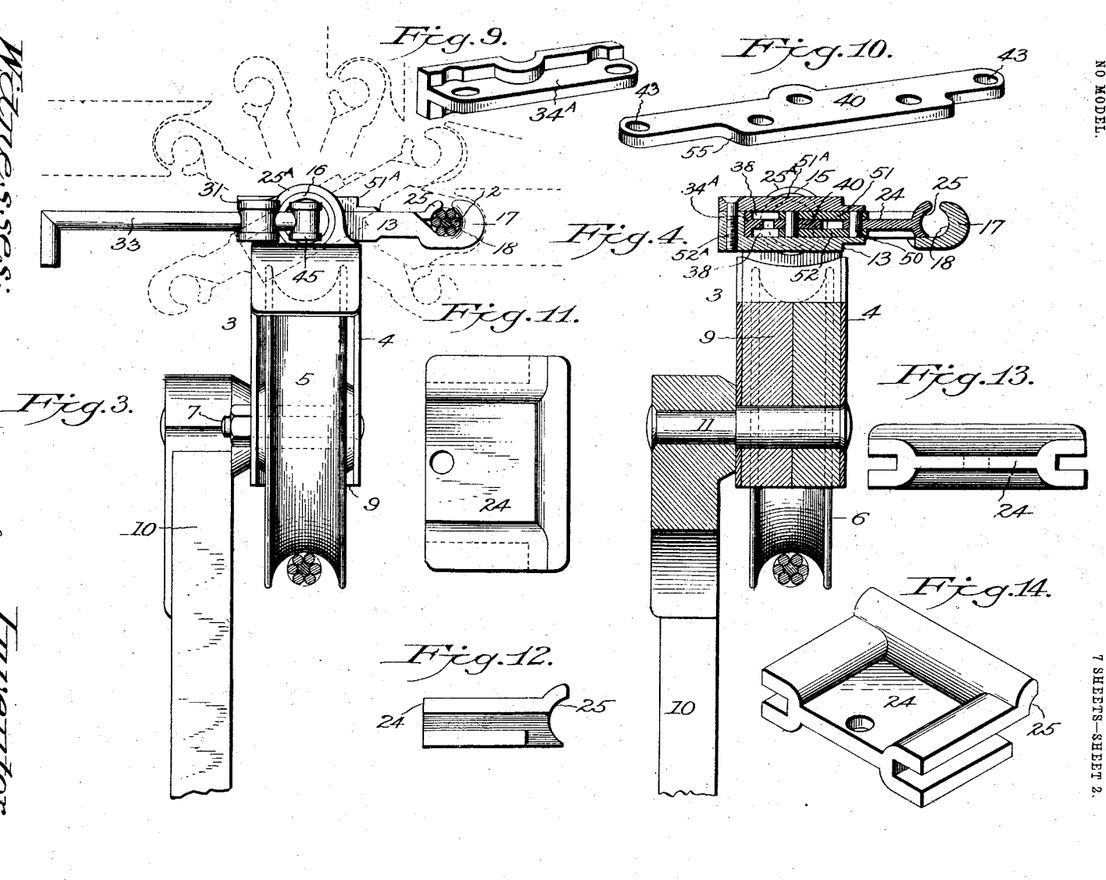
Fig. 3 is an end elevation of Fig. 1.
Fig. 4 is a sectional end elevation on line 4 4 of Fig. 1.
Fig. 9 is a perspective view of the abutment-plate of the toggle-levers of the grip.
Fig. 10 is a perspective view of the connecting-rod.
Fig. 11 is a plan view of the movable jaw of the grip.
Fig. 12 is a side elevation of Fig. 11.
Fig. 13 is an end elevation of the movable jaw.
Fig. 14 is a perspective view of the movable jaw.

My improved friction-grip consists of a suitable supporting-frame 13, or casing 13, in which a pocket 14 is formed in its central portion. The main portion of the frame is provided at its opposite ends with trunnions 15 and 16. These trunnions are hollow and the apertures through them are in axial alinement with one another. The supporting-casing extends laterally at substantially right angles from the axial line through the trunnions and from between them a short distance, and at the end of this extending portion a fixed-jaw 17 is formed, which comprises an upwardly-extending end portion that is provided with a semicircular recess 18, that faces the pocket and is preferably arranged parallel to the trunnions, which is adapted to receive about one-half of the diameter of the traction-rope. The back edge of this fixed jaw is concaved, as at 18ᴬ, in order to allow it to fit close against the tread of the periphery of a sheave or pulley when passing around it. The pocket in the casing extends close to the jaw 17, it being formed by the thin bottom of the casing and the surrounding sides 20 and the end 21. The top of the trunnions project a trifle above the top of the sides of the casing. Consequently the bottom of the pocket is below the axial center of the hollow trunnion and forms a receptacle for the gripping mechanism. The sides of the extension portion of the pocket of the casing is provided with projecting slide-lugs 22 and 23. On these lugs I slidably mount a movable jaw 24, which has a semicircular rope-receiving recess 25 in its edge to register opposite to and parallel with the fixed jaw. The trunnions fit into a pair of trunnion-boxes 25ᴬ and 26, that form an integral part of the supporting-base 27 of my improved grip. The base is divided, preferably as shown, in order that the trunnion-boxes may be placed in the trunnions of the casing. The two parts of the base are then secured to any desired part of either a trolley or of a bucket-pendant. The parts of the base are bolted together by bolts 28 and 29 and the base is bolted to any part of a trolley or of a bucket or carrier pendant through the bolt-holes 30. When, however, my improved grip is to be secured to a trolley, as would be the case in an overhead-traction system, I preferably attach the base of the grip directly to the trolley-housing or spreader-block and preferably make the trunnion-boxes an integral part of the spreader-block, as shown in Figs. 1, 2, 3, 4, as this arrangement makes a more compact and neater attachment for the casing of the grip to the trolley, and where I secure the grip to the pendants of a bucket or carrier, as in the depending traction-rope system, I bolt the base to a cross-bar of the pendant; but in this case I preferably make the trunnion-boxes an integral part of a swiveling or rotating base-plate that permits an oscillating movement of the grip in a right-angled plane of movement to the line of the tramway, as shown in Figs. 20, 21, 22, 23, and 24. The trunnion-boxes are provided with a projecting lug 31, which projects laterally from one side of one of them, as well as rearward from it and from the base. This lug is provided with a slot in its end, in which is pivotally secured by a pin 32 an operating-lever 33, by which the grip is locked and unlocked to the traction-rope. The abutment-block 34ᴬ is a T-shaped block which rests with its base against the rear end of the pocket and also rests on the bottom of the pocket. This block is adjustably movable from the rear end of the casing by the screws 34 and 35, which are threaded through the end of the casing to and engage with their inner ends on the back of the block. To the web of the abutment-block I pivotally secure, by pins 36 and 37, two pairs of links 38 and 39, the links being pivoted at one of their ends to the ends of the web of the abutment-block. These links and the web of the block are of a thickness that permits them to fill the pocket of the casing close to the top of its sides. The opposite ends of the links are pivotally secured to the opposite sides of a center lever 40, which I term the "walking-lever," by pivotal pins 41 and 42. This center lever extends through the central portion of the pocket and in line with the apertures in the trunnions, into one of which one end of the lever extends. The ends of the walking-lever are preferably made alike and are each provided with a pin-hole 43 in order that the toggle mechanism may be connected to an operating-lever mechanism, which I arrange at opposite ends of the grip-frame, which is a provision I make in order that the grip can be run in either direction on a tramway-line by providing a right and left hand operating lever mechanism, as will be explained hereinafter. Consequently either end of the walking-lever may be connected to the toggle-operating mechanism, but only one at a time, and the end used determines the direction the grip is to run in to be automatically locked and unlocked to a traction-rope. This toggle-operating mechanism comprises a connecting-rod 44, one end of which is pivotally attached to one end of the walking - lever. The connecting - rod extends through the aperture in the trunnion, which is made enough larger in diameter than the connecting-rod to allow plenty of room for the walking or lifting reciprocal movement of this lever. The opposite end of this connecting-rod is connected to one end of a link 45 by a pivotal or swiveling connection that permits the entire grip-casing and its connecting-rod to oscillate through about three-quarters of a circle on its trunnions over the top of the trolley from one side to the other, as shown in Fig. 3. This link 45 is a yoke or U-shaped link. The end of the connecting-rod is provided with a collar close to its end, the end extending loosely through a hole in the solid end of the link to the collar, and the end is upset to form a head 46. The open end of the link is pivotally secured by a pin 47 to one end of the operating-lever 33. This operating-lever comprises a rod of metal that is pivoted intermediate of its ends to the projecting lug of one of the trunnion-boxes. It comprises, preferably, a curved lever extending a suitable distance from the trolley to avoid contact between the traction-rope and the rail that this lever comes in contact with at the terminals of the tramway-line. Its outer end is provided with a short right-angled extension which engages a locking and releasing rail 49, which is arranged in its path at the terminals of the tramway-line. The end of this operating-lever adjacent to its pivotal connection extends into the axial center of the trunnions of the casing and is pivotally connected through the medium of the clip 45 with the connecting-rod and the walking-lever. To the walking-lever I pivotally secure, by a pin 49$^A$, one end of a pair of levers 51 and 52, placing one on each side of the lever. These levers extend to and are pivotally secured to the rear end of the movable jaw by a pin 50. The spreader, like the base, is divided into two parts, preferably, by a zigzag overlapping joint between the two parts. Each part is mounted on a trunnion of the casing of the grip. The spreader is then inserted between the sides of the housing and is riveted to them by rivets 50$^A$, which also secure the two parts of the spreader together. The projecting trunnion-boxes on both the base and the spreader are raised high enough above the body of the base to allow plenty of clearance-space below for the rear end or heel of the grip's casing to turn in. A cover 51$^A$ fits over the pocket of the casing, extending over the sides between the trunnions and rear end, to which it is detachably secured by screws 52$^A$. In order to limit the movement of the toggles to just past the centers, I place stop-pins 53 in the pockets in the path of a shoulder 55, formed on the walking-lever.

Figures 15, 16, 17, 18, 19:
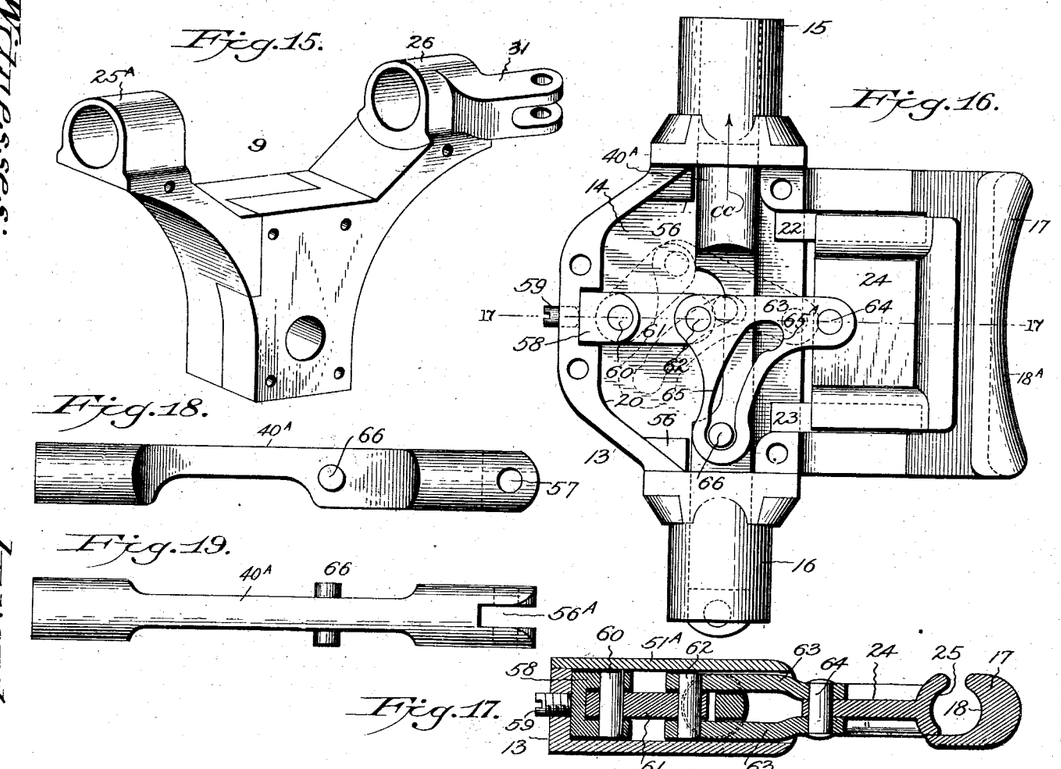
Fig. 15 is a perspective view of a form of spreader-block I preferably use when attaching my grip to the trolley of a bucket or carrier.
Fig. 16 is a plan view of the interior of a grip, showing a slight modification in the lever mechanism only of the grip shown in Figs. 1, 2, 3, and 4.
Fig. 17 is a sectional end view of Fig. 16 on line 17 17.
Fig. 18 is a plan view of the connecting-rod of the modification shown in Fig. 17.
Fig. 19 is a side elevation of the connecting-rod of the grip shown in Fig. 18.
Figure 20:
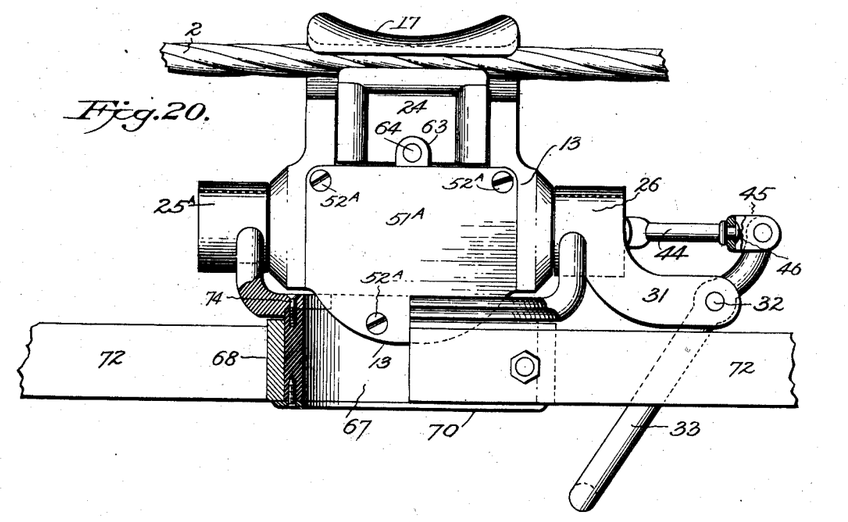
Fig. 20 is a plan view, partly in section, of the grip attached to a swiveled base and attached to the cross-bars of the pendant.
Figure 21:
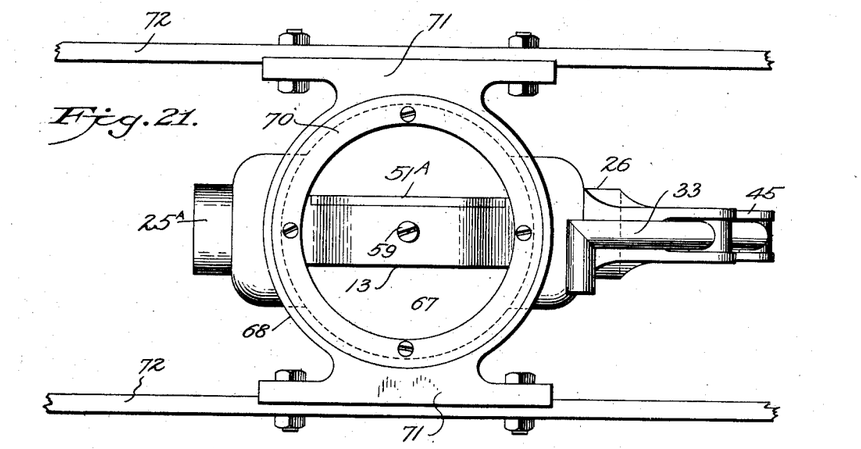
Fig. 21 is a side elevation of Fig. 20.

In Figs. 16 and 17 I show a modification of the movable jaws' toggle mechanism. The balance of the grip is the same as in Figs. 1 and 2, except that the rear end of the casing is made a little wider from the axial line of trunnions. In this modification the walking-lever 40$^A$ is provided with round end portions adjacent to its terminal ends which fit slidably the apertures in the trunnions, and lugs 56 project out from the end of the casing and form guides. One of the ends of the walking-lever is provided with a slot 56$^A$, and a pin-hole 57 is formed through the slotted end to connect with the connecting-rod 44, which, together with the operating-lever, is the same as in Figs. 1 and 2. This modification is provided with a much shorter abutment-block 58, which is adjusted by one screw 59, that is threaded in the end of the casing to bear at its center. I preferably make this abutment-block in the form of a U, positioning it so that the screw will bear on its back or solid portion opposite the slot, as shown in the section figure, and in its slot I pivot by a pin 60 one end of a short lever 61, that stands straight toward the jaws at right angles to the axis of the trunnions. This lever preferably extends to close to the walking-lever, and its opposite end is pivotally secured by a pin 62 to a pair of right-angled armed levers 63, that straddle the walking-lever. The straight arms of these two angled levers are positioned in alinement with the lever 61 and are pivotally secured by a pin 64 to the movable jaw. The right-angled arms of these levers extend along the walking-lever and are each provided with a slot 65, that is mounted on a pin 66, that is fitted tight in the walking-lever and projects from either side of it far enough to project through the thicknesses of these levers. The slot 65 is a curved slot extending from close to the end of the right-angled arms of these right-angled levers into and toward the jaw end of the straight arms of these levers, and at the end of the curved slot there is an angle or turn 65$^A$ in the slot that extends far enough along the straight arms to receive the full diameter of the pin after it leaves the curved slot.

Figure 24:
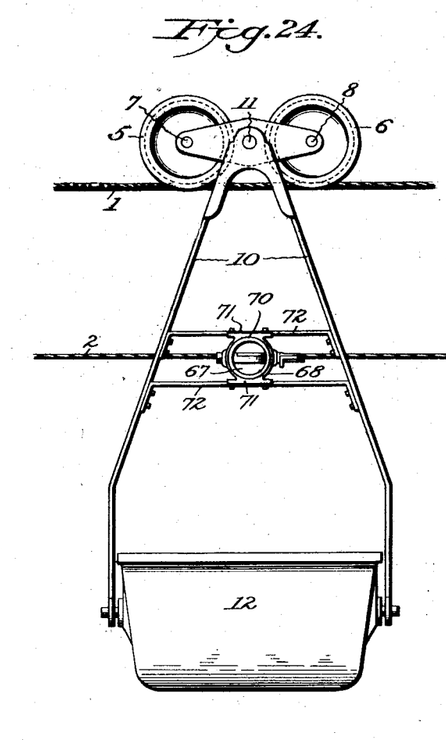
Fig. 24 is a side elevation of a bucket and pendant and trolley on a track-rope, showing the application of my grip to tramway systems in which the traction-rope is placed below the stationary rope.

In applying my grip system, in which the traction-rope is placed below the track-rope, I preferably provide my improved grip with a swiveling-base, by means of which the jaws may swivel or oscillate at right angles to the run of the tramway-line, and thus permit the base, which is attached to a bucket or carrier when running down or up a steep incline, and the jaws of the clip to swivel on each other, as a bucket or carrier hangs substantially perpendicular at all times, while the track and traction ropes assume various inclinations in the length of a tram-line. The swiveling-base I preferably use comprises a ring 67, which I term the "swiveling-ring,"

and a ring 68, which I term a "fixed" ring. The fixed ring fits revolubly over the swiveling-ring against a shoulder 69, formed on it, and is secured revolubly to the swiveling-ring by a flanged ring 70, that is secured to the end of the swiveling-ring and overlaps the edge of the adjacent end of the fixed ring. The fixed ring is provided with two projecting shoe portions 71, which are positioned on opposite sides of the fixed ring and parallel with one another. These shoes are bolted to two parallel cross-bars 72, that extend across and are secured to the sides of the pendant of the bucket or carrier, as shown in Fig. 24.

Figure 22:
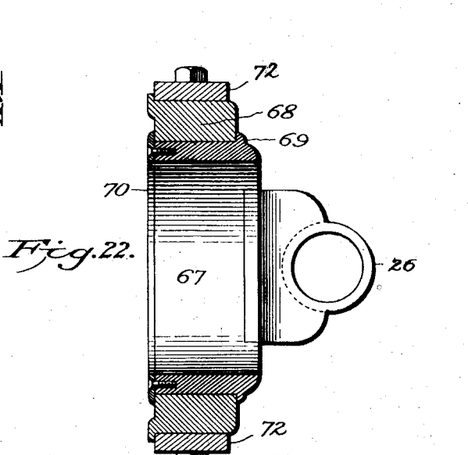
Fig. 22 is a central section of the swiveling base-plate I employ for supporting my improved grip when it is to be attached to a bucket or pendant carrier.
Figure 23:
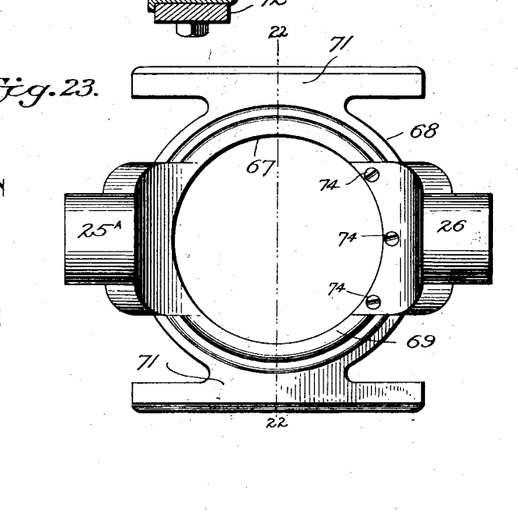
Fig. 23 is a side view of the swiveling base-plate.
Figure 25:
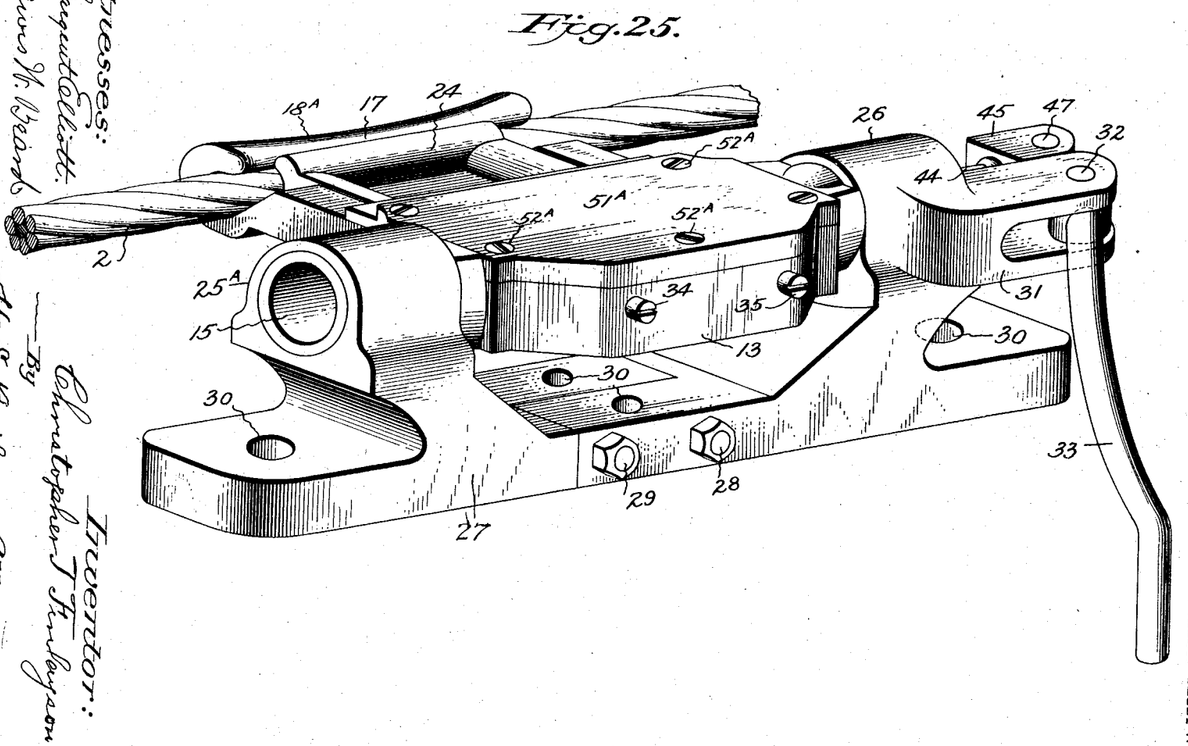
Fig. 25 is a perspective view of my improved friction-grip.

My grip, as illustrated in Fig. 25, can be secured to the top of the swiveling-ring, if desired, and the parts can then be made separate and may be attached together in any suitable manner. I preferably, however, form one of the trunnion-boxes of the grip integral with the swiveled ring and secure the other trunnion-box to the ring by screws 74, as shown in Figs. 22 and 23, thus making the base-piece that supports the trunnion-boxes consist of an integral cylindrical ring and the trunnion-boxes, as shown in Fig. 22, instead of the general base. (Shown in Fig. 25.)

Figures 5, 6:
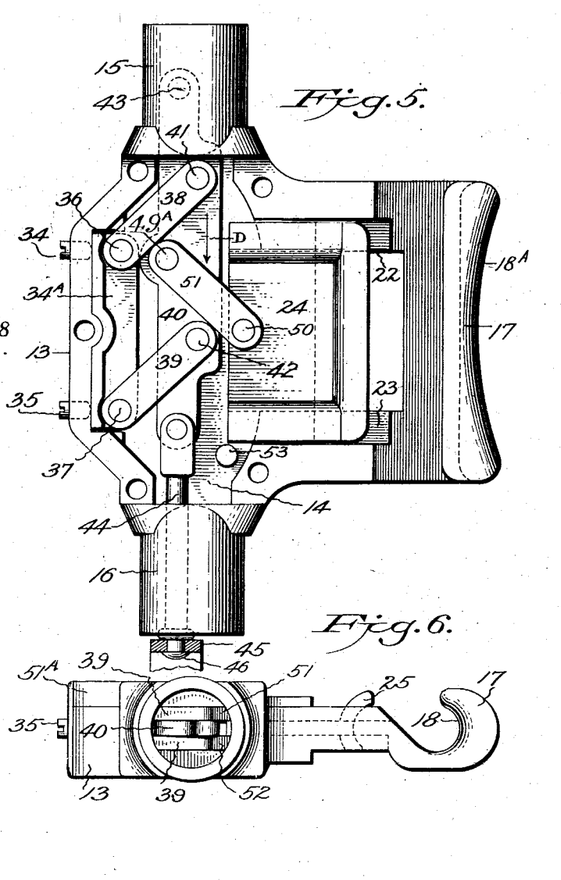
Fig. 5 is a plan view of my improved grip with the cover removed, showing the movable jaws' actuating-levers.
Fig. 6 is an end view of Fig. 5.
Figures 7, 8:
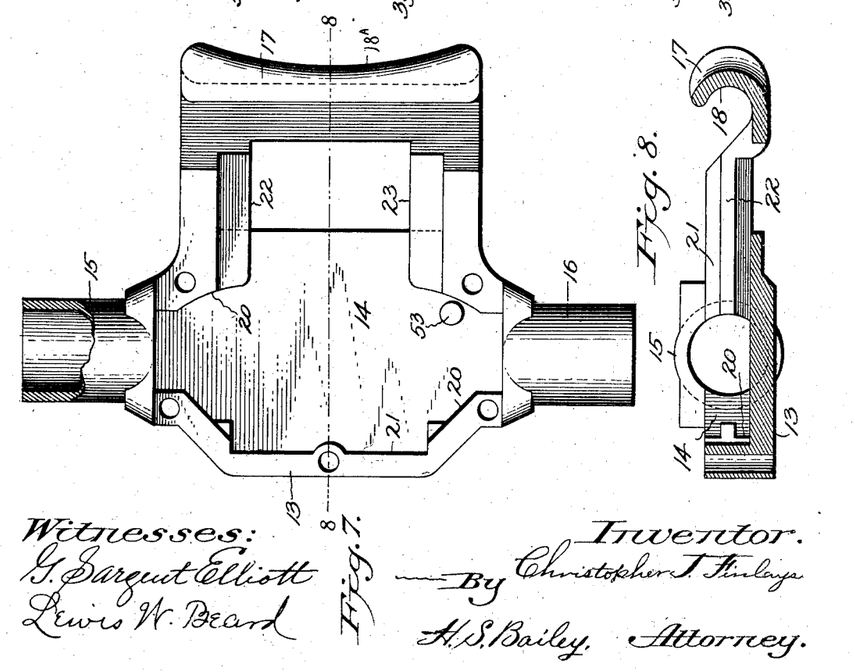
Fig. 7 is a plan view of the fixed jaw and the supporting-frame of the grip.
Fig. 8 is a sectional view on line 8 8 of Fig. 7.

The operation is as follows: The grip-operating lever always stands in a fixed position relative to the track-rope. When this lever and the toggles stand in the position shown in Figs. 5 and 6, the movable jaw is drawn back out of operative gripping position. Then by a movement of the lever in the direction of the arrow D the walking-lever in Figs. 2 and 5 is moved to bring the toggle-levers just a little past their centers and in direct alinement with the sliding movement of the movable jaw, in which position they lock themselves against accidental displacement. At this point the further movement of the walking-lever and of the operating-lever and the toggles is arrested by the stop-pin 53, against which the shoulder of the walking-lever strikes. The movable jaw is then gripping the rope, as shown in Fig. 2, and the amount of gripping pressure can be regulated by the adjustment of the abutment-block. To release the rope from the grip, it is only necessary to secure the rail at any desired point of the opposite terminal in the path of the operating-lever, as shown in Fig. 2. Then when the operating-lever strikes the rail it is moved in the direction of the arrow B B, which reverses the movement of the walking-lever and moves it and the toggle-levers back to the position shown in Fig. 5, thus releasing the traction-rope. Of course the locking and unlocking rails can be placed at any desired point in the length of a tramway-line, but they are usually placed on some part of the terminals when the grip is attached to a trolley, as shown in Figs. 1 and 2. It will run around the terminal sheaves and can be released at any desired point of the opposite side of the terminal it enters the terminal on. In the modification the toggles and the movable jaw are shown in rope-gripping operative position, the walking-levers and operating-levers being operated in exactly the same manner as in Figs. 1, 2, 3, 4, 5, and 6. The right-angled levers, however, operate to move the movable jaw by tilting on its pivotal connection to the jaw, which bends the joint between the lever and the right-angled lever, as shown by the dotted lines. This is caused by the jaw-releasing movement of the walking-lever in the direction of the arrow C C. As this lever is moved in that direction the pin as it travels through the slot tilts the right-angled lever on the pivotal pin 64 and breaks the joint between it and the lever and moves the angled lever and the movable jaw back, thus releasing the traction-rope, and when the walking-lever is moved by the operating-lever into the position shown in Fig. 16 the jaw is moved into operative gripping position against the rope.

My improved grip will run under or over or against sheaves placed in horizontal, vertical, or oblique positions, and is particularly adapted to be used on tramway systems capable of making reverse curves—as, for example, the system embodied in my application, Serial No. 134,420, filed December 8, 1902.

My improved grip is very simple, compact, light of weight, and durable, and not liable to get out of order.

Having described my invention, what I claim as new, and desire to secure by Letters Patent, is—

1. In a friction-grip for wire-rope tramways, a suitable supporting-casing having a fixed jaw thereon, trunnions on opposite sides of said casing placed substantially parallel with said fixed jaw and a supporting-base provided with suitable trunnion-supporting boxes pivotally attached to said trunnions and adapted to be connected to suitable parts of the carrying device of a wire-rope tramway such as the trolley, or bucket, or carrier-pendant, substantially as described.

2. In a friction-grip for wire-rope tramways, a suitable supporting-base arranged and adapted to be secured to the trolley or pendant, of a bucket or carrier, provided with journal-boxes, a casing provided with oppositely-disposed trunnions operatively arranged to be pivotally mounted in the journal-boxes of said base and arranged and adapted to swing on said trunnions through substantially three-quarters of a circle over said base from one side of it to its opposite side, a fixed jaw on said casing, a movable jaw operatively supported in rope-gripping relation to said fixed jaw, and means including a system of levers for moving said movable jaw to operatively grip a rope between itself and said fixed jaw, substantially as described.

3. In a friction-grip, a suitable casing provided with a fixed jaw, a supporting-base to which said casing is pivotally secured, slideways in said casing, a movable jaw mounted in said slideways, means including a reciprocating lever operatively mounted in said casing adjacent to said jaw, for operatively moving said movable jaw to grip a rope between itself and said fixed jaw, an operating-lever pivotally secured to said base and projecting from said base and casing, and means including a system of levers for moving said movable jaw to operatively grip a rope between itself and said fixed jaw, substantially as described.

4. In a friction-grip, a supporting-casing provided with hollow trunnion-bearings at its opposite sides, a supporting-base provided with boxes adapted to pivotally support the trunnions of said casing, a lateral-extending portion on said casing having a rope-receiving jaw at its end arranged to face said trunnions and casing and arranged substantially parallel with said trunnions, a jaw slidably mounted in said lateral extension of said casing, and arranged opposite to said fixed jaw and having a grooved face adapted to fit partially over a rope, a lever mounted in said hollow trunnions, two levers pivotally secured at one of their ends to said first-named lever adjacent to its ends, and at their opposite ends to an abutment-block in said casing, a third lever pivotally secured at one end to said first-named lever and at its opposite end to said movable jaw, means including screws for adjusting said abutment-block, and means including an operating-lever pivotally secured to said base and operatively connected to said lever for operating said levers to move said movable jaw to grip a rope between said movable and said fixed jaws, substantially as described.

5. In a friction-grip, the combination with a suitable supporting-base, a casing pivotally mounted to swing over said base from side to side, a fixed jaw on said casing, a movable jaw mounted in said casing arranged and adapted to grip a rope against said fixed jaw, a reciprocating lever mounted loosely in said casing at substantially right angles to the operative movement of said movable jaw, a lever pivoted at one end to said movable jaw and at its opposite end to said lever, a lever pivotally attached at one end to said reciprocating lever at each side of said movable-jaw lever, an abutment-block in said casing, means including screws for adjustably moving said abutment-block, levers pivotally attached at one end to said reciprocating lever and at their opposite end to said abutment-block, an operative lever pivotally secured to said casing and operatively connected to said reciprocating lever and means including an obstruction placed in the path of said operative lever and arranged and adapted to move said operative lever to reciprocate said reciprocal lever and to operate said movable jaw, substantially as described.

6. In a friction-grip for wire-rope tramways, the combination with the trolley having a pair of journal-bearing boxes secured thereto, a casing provided with oppositely-disposed hollow trunnions mounted in said trolley-bearings, a fixed jaw on said casing, a curve on the back edge of said fixed jaw, a movable jaw arranged to grip a rope against said fixed jaw, and means including an operative lever for operating said movable lever, substantially as described.

7. In a friction-grip, the combination with a suitable supporting-base, a casing provided with a fixed jaw, pivotally mounted in said base, a jaw slidably mounted in said casing and adapted to grip a rope between itself and said fixed jaw, a reciprocating lever in said casing, toggle-levers in said casing, an operative lever pivotally secured to said supporting-base and a pivotal swiveling connection between said operating-lever and said reciprocating lever, substantially as described.

8. In a friction-grip, the combination with a suitable supporting-base provided with journal-boxes, a casing pivotally journaled in the journal-boxes of said base, provided with a fixed jaw, a sliding jaw operatively mounted in said casing opposite said fixed jaw, a reciprocating lever in said casing, an adjustable abutment-block in said casing, levers pivotally connected to said abutment-block and said reciprocating lever, levers pivotally connected to said reciprocating lever and said sliding jaw, a rod pivotally connected to one end of said reciprocating lever, an operating-lever pivotally connected to said supporting-base and means including a pivotal, swiveling connection arranged and adapted to operatively connect said operating-lever to said reciprocating lever to move said sliding jaw to grip or release a rope between itself and said fixed jaw, substantially as described.

9. In a friction-grip for wire-rope tramways, the combination with the trolley provided with journal-boxes, of a casing provided with a fixed jaw having a curved back edge pivotally mounted in said journal-bearings to swing over said trolley; a movable jaw in said casing opposing said fixed jaw, an operating-lever secured to said trolley, and means including levers and a pivotal swinging connection between said operating-lever and said levers for operatively actuating said movable jaw to grip or release a rope between itself and said fixed jaw at predetermined points in a tramway-line, substantially as described.

10. In a friction-grip for wire-rope tramways, the combination of a trolley provided with bearings, a casing pivotally mounted in the bearings of said trolley, the fixed jaw on said casing, the movable jaw in said casing, the reciprocating lever in said casing, the adjustable abutment-block in said casing, the levers connecting the ends of said abutment-block to said reciprocating lever, the levers connecting said reciprocating lever to said movable jaw, the operating-lever, the rod pivotally connected to said reciprocating lever, the swiveling, pivotal connection between said operating-lever and said rod, and means including an engaging device positioned at predetermined points in the tramway-line for operating said operating-lever to cause said movable jaw to grip or release a rope between itself and said fixed jaw, substantially as described.

11. In a friction-grip for wire-rope tramways, the combination with the trolley, a casing pivotally secured to said trolley, a fixed jaw on said casing, a curve to fit a pulley in the back of said jaw, a movable jaw in said casing, an operating-lever operatively secured to said trolley and means including a system of levers, and an engaging device for actuating said operating-lever to operate said movable jaw to grip or release a rope between itself and said fixed jaw, substantially as described.

12. In a friction-grip for wire-rope tramways, the combination with a bucket or carrier trolley, of trunnion-bearings positioned on the top edge of said trolley, a casing provided with a fixed jaw and having trunnions pivotally mounted in said trunnion-bearings to swing over from side to side of said trolley, a movable jaw in said trolley, a plurality of swinging levers adjustably and pivotally arranged and positioned in said casing to move said movable jaw to grip a rope against said fixed jaw and to move from a position of disuse to a trifle past their centers of alinement with the resisting gripping-pressure of said movable jaw, an operating-lever pivotally secured to said trolley and means including a pivotal swiveling connection between said operating-lever and said levers for moving said lever to operate said movable jaw to grip or release a rope, substantially as described.

13. In a friction-grip for wire-rope tramways, the combination of the trolley having a pair of journal or trunnion boxes on its top edge with an operative friction-grip pivotally mounted in said journal or trunnion boxes to swing over the top of said trolley from one side of it to the other side of it, substantially as described.

14. In a friction-grip for wire-rope tramways, the combination with a trolley having a spreader-block between its sides provided with trunnion or journal bearings at each end, a casing provided with hollow trunnions pivotally mounted in said trunnion or journal bearings, a lateral extension on said casing having a fixed jaw at its end, a jaw slidably mounted in said casing, a reciprocating lever loosely positioned in said casing and extending into said hollow trunnions, an abutment-block in said casing adjacent to said reciprocating lever, levers pivotally secured at one end to said abutment-block and at their opposite ends to said reciprocating lever, means including screws for adjusting said abutment-block, a rod pivotally secured to one end of said reciprocating lever, an operating-lever pivotally secured to one of the trunnions or journal-boxes of said spreader-block having one end extending into the axial plane of the rod pivotally secured to one end of said reciprocal lever, and a pivotal swiveling connection between said clip and the opposite end of said rod arranged and adapted to permit said rod to oscillate in the clip at right angles to the plane of movement of said operative lever, substantially as described.

15. In a friction-grip for wire-rope tramways, the combination of the trolley-sheaves and the side housing, with a spreader-block secured between said housing and sheaves provided with oppositely-disposed and axially-arranged trunnion or journal bearings projecting above said spreader-block and an operative rope-gripping friction-grip pivotally mounted in said trunnion or journal bearings to swing over the top of said trolley-sheaves and side housing from side to side, substantially as described.

16. In a friction-grip for wire-rope tramways, the combination of the sheaves and the side housing, with a spreader-block adapted to be secured between the sheaves and housing and divided into two parts and having a trunnion or journal bearing on each part, substantially as described.

17. In a friction-grip for wire-rope tramways, the combination of the trolley comprising the sheave-wheels and the housing, a spreader-block secured between said sheave-wheels, trunnion or journal boxes projecting therefrom, with a casing provided with a fixed jaw and a trunnion at the opposite sides of said casing pivotally journaled in said trunnion or journal boxes, substantially as described.

18. In a friction-grip the combination of the trolley provided with projecting trunnion or journal bearings with the casing pivotally mounted in said trunnion on pivotal bearings of said trolley and provided with a fixed jaw, with the sliding jaw, the reciprocating lever, the adjustable abutment-block and the levers for actuating the movable jaw, substantially as described.

19. In a friction-grip for wire-rope tramways, the combination of the casing having trunnions and a fixed jaw a circular base provided with journal or trunnion bearings and a casing arranged to pivotally surround said circular base and adapted to be secured to a trolley-pendant of a bucket or carrier, substantially as described.

20. In a friction-grip for wire-rope tramways, the combination with the fixed-jaw casing, the movable jaw and operating-levers operatively mounted thereon, of a ring provided with oppositely-arranged trunnion-boxes or journals, a shoulder on said ring, a casing revolubly mounted on said ring against said shoulder, a flanged ring secured to the said trunnion-ring, said casing being provided with oppositely-positioned shoes, and arranged to be detachably secured to the trolley-pendant of a bucket or carrier, substantially as described.

21. In a friction-grip for wire-rope tramways, the combination with a trolley-pendant, the casing provided with the fixed jaw, the movable jaw and the operating-lever, of a suitable supporting-base pivotally journaled to said casing, a circular ring secured to said base and a casing arranged to surround said ring and pivotally mounted thereon and arranged to secure said casing to said ring, oppositely-disposed lugs on said casing, and bars secured to said lugs and adapted to be secured to said pendant, substantially as described.

22. In a friction-grip for wire-rope tramways, the combination with the trolley-pendant and the fixed-jaw casing provided with trunnions at its sides, the movable jaw and the operating-levers, of a supporting-base comprising a ring, oppositely-positioned trunnion or journal boxes on said ring arranged and adapted to be pivotally secured to the trunnions of said jaw-casing, a casing rotatably mounted on said ring and means including cross-bars secured to said casing for securing said casing and grip to said trolley-pendant, substantially as described.

23. In a friction-grip for wire-rope tramways, the combination of the casing and its pivotal supporting-base, the sliding jaw, the reciprocating lever, the adjustable abutment-block, the lever pivoted at one end to said adjustable block, a pin projecting from said reciprocating lever, with an angled lever pivoted at one end to said sliding jaw and at its opposite end to the free end of the lever pivoted to the abutment-block, and a curved slot in said angled lever fitting slidably over said pin and extending in a curve toward the jaw end of said angled lever, and the levers for operating said reciprocating lever, substantially as described.

24. In a friction-grip for wire-rope tramways, the combination of the fixed jaw and its supporting-casing, the pivotal supporting-base of said casing, and the operating-lever and actuating-rail, with the reciprocating lever, the adjustable block, the levers pivotally extending from said adjustable block, a pin projecting from opposite sides of said lever an angled lever pivotally secured to said adjustable-block lever at one end to said sliding jaw at the opposite end, a curved slot in said angled lever mounted on said pin, and having said slot and abutment-lever arranged and adapted to be moved by the reciprocal movement of said reciprocal lever to operatively move said sliding jaw to grip a rope between itself and said fixed jaw, substantially as described.

25. In a friction-grip for wire-rope tramways, the combination of the supporting-base, the grip-casing and fixed jaw, the operating-levers and the locking and unlocking device adapted to be placed in the path of said operating-lever, with the sliding jaw, the adjustable abutment-block, the reciprocating lever and the right-angled lever pivotally connected at one end to said sliding jaw, and slidably connected at its opposite end to said reciprocating lever to tilt as said reciprocating lever is operated, and the levers pivotally attached at one end to said right-angled lever and at their opposite end to said abutment-block, substantially as described.

In testimony whereof I affix my signature in presence of two witnesses.

CHRISTOPHER T. FINLAYSON.

Witnesses:
G. SARGENT ELLIOTT,
LEWIS W. BEARD.